United States Patent [19]

Nakanishi et al.

[11] Patent Number: 5,273,389
[45] Date of Patent: Dec. 28, 1993

[54] PACKAGE STORING APPARATUS

[75] Inventors: Kazuo Nakanishi, Uji; Yasuo Okuyama, Ohtsu, both of Japan

[73] Assignee: Murata Kikai Kabushiki Kaisha, Kyoto, Japan

[21] Appl. No.: 852,968

[22] Filed: Mar. 17, 1992

[30] Foreign Application Priority Data

Mar. 29, 1991 [JP] Japan .............................. 3-27046[U]

[51] Int. Cl.⁵ ............................................. B65G 1/12
[52] U.S. Cl. .................................. 414/277; 414/331; 74/110
[58] Field of Search ............... 414/277, 280, 331, 267; 312/268; 74/110

[56] References Cited

U.S. PATENT DOCUMENTS

| | | | |
|---|---|---|---|
| 3,403,794 | 10/1968 | Lopez | 414/280 |
| 3,777,581 | 12/1973 | Sartori | 74/110 |
| 3,883,203 | 5/1975 | Lexe | 312/268 |
| 4,007,846 | 2/1977 | Pipes | 414/280 X |
| 4,113,082 | 9/1978 | Timin | 312/268 X |
| 4,676,560 | 6/1987 | Schmitz et al. | 312/268 |
| 4,690,602 | 9/1987 | Castaldi et al. | 414/280 X |
| 4,728,253 | 3/1988 | Oba et al. | 74/110 X |

FOREIGN PATENT DOCUMENTS

| | | | |
|---|---|---|---|
| 3110700 | 10/1982 | Fed. Rep. of Germany | 414/277 |
| 3539115 | 5/1987 | Fed. Rep. of Germany | 414/277 |
| 0222905 | 9/1987 | Japan | 414/331 |
| 1022875 | 6/1983 | U.S.S.R. | 414/277 |
| 1399226 | 5/1988 | U.S.S.R. | 414/280 |
| 1491769 | 7/1989 | U.S.S.R. | 414/277 |

*Primary Examiner*—Michael S. Huppert
*Assistant Examiner*—James Keenan
*Attorney, Agent, or Firm*—Spensley Horn Jubas & Lubitz

[57] ABSTRACT

A package storing apparatus wherein a belt conveyor is provided adjacent to a package storehouse provided with a number of placing shelves on which a package erected on a tray is placed. A package transfer device for transferring a package between the package storehouse and the belt conveyor comprises a fluid-pressure actuator arranged in a vertical direction, a rack connected with the fluid-pressure actuator and reciprocated thereby, a transfer sack connected with the sack by a driving force transmitting device, and a hook for holding the tray, which is provided on a support rod secured to the transfer sack.

5 Claims, 3 Drawing Sheets

PACKAGE STORING APPARATUS

BACKGROUND OF THE INVENTION

1. Field of the Invention

The present invention relates to a package storing apparatus for temporarily receiving and storing packages in order to sequentially smoothly transport the packages to a next processing step.

2. Prior Art Statement

According to a conventional package storing apparatus, as shown in FIGS. 3 and 4 which illustrate the entire structure thereof, a number of rows of package placing shelves 41 capable of placing a plurality of packages P in one row are arranged in a longitudinal direction, and several lines thereof are provided. Opposite ends of the package place shelves 41 are connected by an endless chain 42. The chain 42 is extended, in a zigzag fashion, over sprockets 44 . . . and 50 provided at an upper portion and at a lower portion within a package storehouse 43 and rotates in a direction as indicated at arrow A. Each package placing shelf 41 is supported to be able to swing about a shaft secured to the chain 42, and a placing surface of each package placing, shelf 41 is always upwardly directed due to the weight of the package placing shelf 41.

In use of the package storehouse 43 as described above, a package P formed by a winder is put upright on a tray 52 and is transported to a supply port 55 open to the side face of a housing 54 of the package storehouse 43 by a package supplying conveyor 53. The number of packages capable of being received in each row of package placing shelves 41 are continuously transported. On the other hand, one of the empty package placing shelves 41 stops before the supplying conveyor 53. Thereafter, when the trays for one row of packages P on the package supplying conveyor 53 are pressed from their sides by a pusher 56 in a direction as indicated by an arrow, the packages P are transferred into the package placing shelf 41.

Similar operation is repeated so that the packages P are received into the package placing shelves 41. Various kinds of packages P can be received into the package placing shelves 41, in which case, kinds of packages in each row of package placing shelves 41 are stored in a memory.

On the other hand, in take-out operation of packages P, a predetermined package placing shelf 41 is stopped in front of a delivery conveyor 57, and a tray carrying a package P and placed on the package placing shelf 41 is extruded by a pusher 59 arranged oppositely of the pusher 56 to thereby extrude the package P on the package placing shelf 41 from a discharge port onto the delivery conveyor 57. The discharged package P is transported by the delivery conveyor 57 to a predetermined site.

In the conventional apparatus, the pushers 56 and 59 are arranged in a horizontal direction opposing the tray, and therefore, the length of the pushers 56 and 59 should be determined in consideration of a stroke corresponding to a spacing between the conveyor 53 and the package placing shelf 41. Therefore, a space corresponding to that length is required. Accordingly, dead spaces for long pushers are left, and spaces in the factory and in the storehouse are sometimes uneconomical.

OBJECT AND SUMMARY OF THE INVENTION

An object of the present invention is to propose an arrangement of a package storing apparatus which may utilize spaces in a factory and spaces in a storehouse effectively.

For improving the prior, the present invention provides an arrangement wherein a belt conveyor is provided adjacent to a package storehouse provided with a number of place shelves on which packages stood upright are placed, a rack reciprocated by a fluid-pressure actuator arranged in a vertical direction and a transfer rack reciprocated in a lateral direction are connected by a driving force transmitting device, and a hook for holding the tray is provided on a support rod connected and secured to said transfer rack. A dead space is eliminated by the arrangement of the fluid pressure actuator in a vertical direction.

With the arrangement as described above, in transfer of a package between the placing shelf in the package stocker and the conveyor, the vertical reciprocation caused by actuation of the fluid pressure actuator arranged in a vertical direction is converted into the lateral reciprocation of the transfer rack by the drive device. The lateral reciprocation of the transfer rack causes the support rod secured to the transfer rack to be reciprocated, and a flange of the tray is held by rotating the hook provided on the support rod whereby the package put upright on the tray is transferred between the placing shelf in the package storehouse and the belt conveyor.

DETAILED DESCRIPTION OF PREFERRED EMBODIMENT

Figure 1:
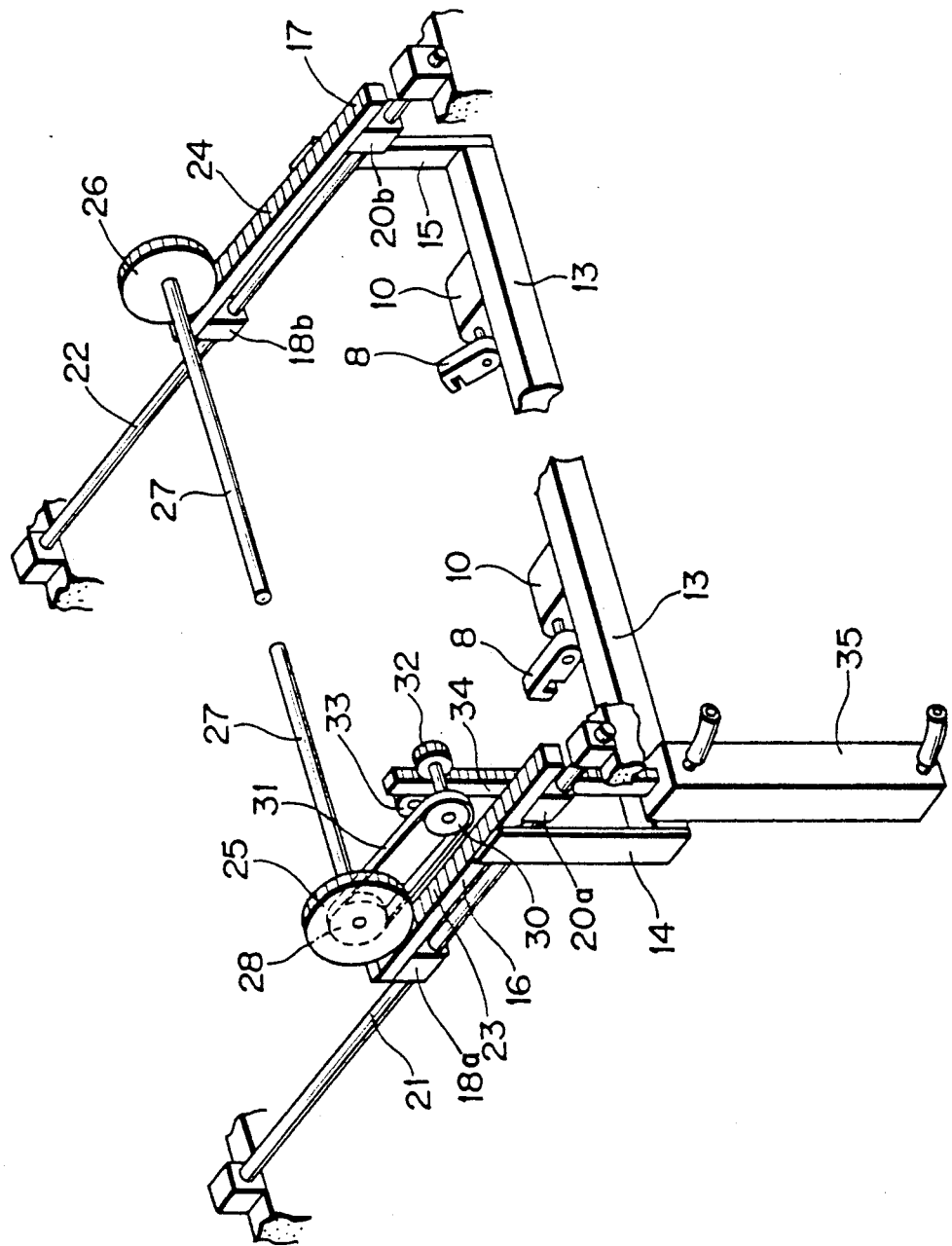
FIG. 1 is a perspective view of an important part in an embodiment according to the present invention.
Figure 2:
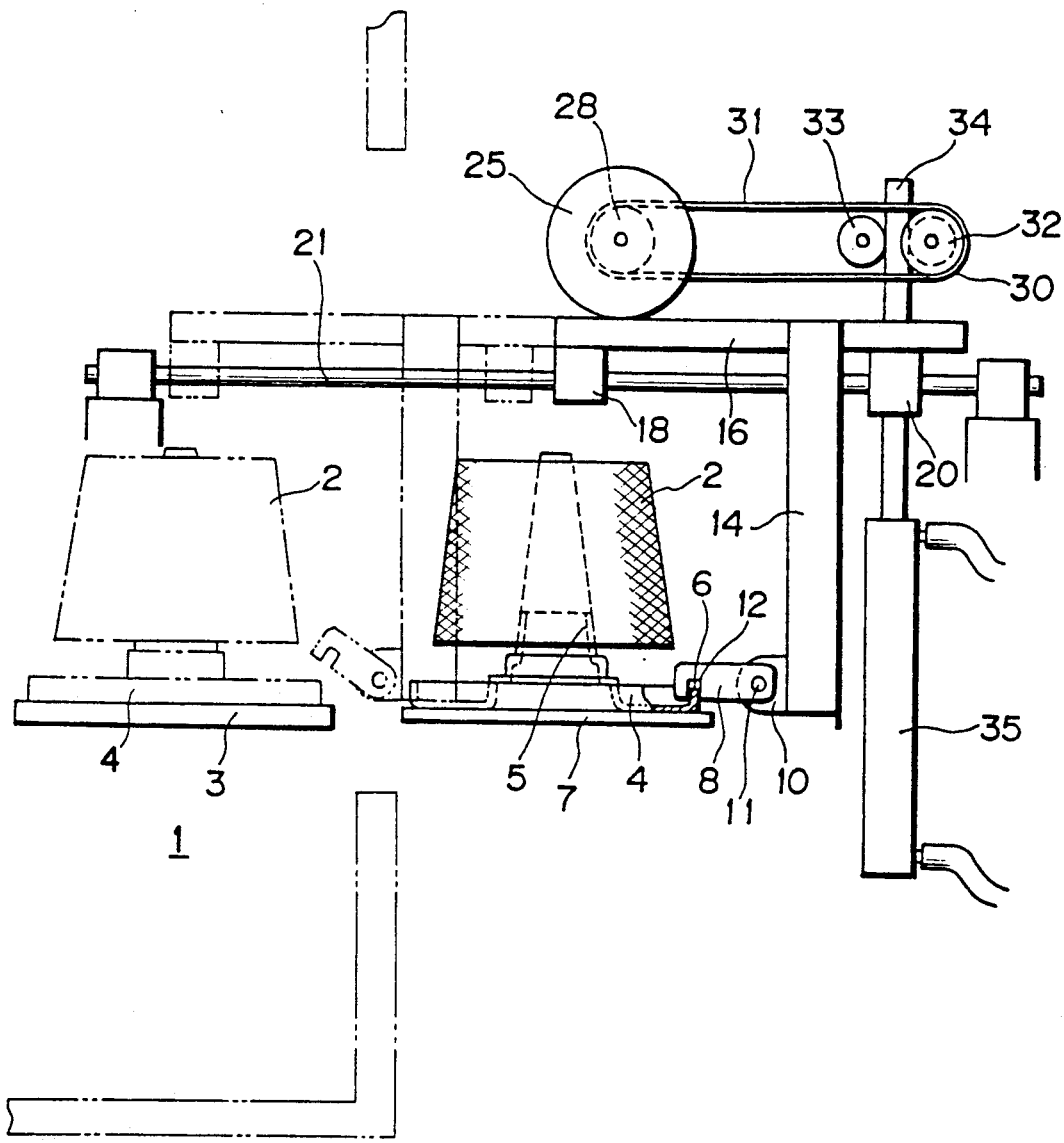
FIG. 2 is a side view of an important part in an embodiment according to the present invention.
Figure 3:
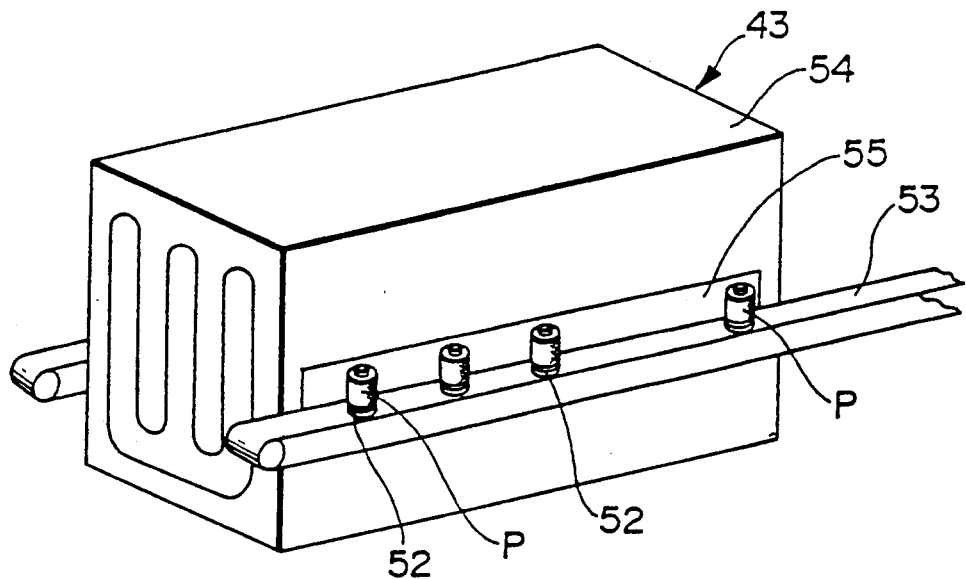
FIG. 3 is a schematic view of a package storing apparatus to which the present invention may be applied.
Figure 4:
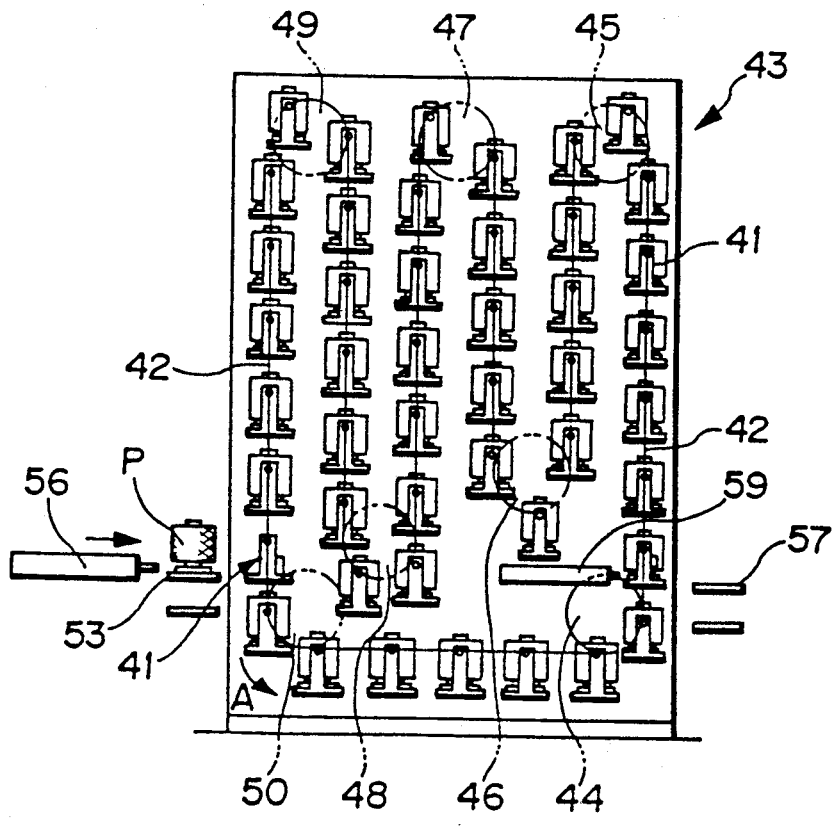
FIG. 4 is a side view of a conventional package storing apparatus.

An embodiment of the present invention will be described with reference to the drawings. A package 2 stored, as shown in FIG. 2, within a package storehouse 1 is erected on a peg 5 of a tray 4 supported on a placing shelf 3. An upwardly rising flange 6 is provided in the outer periphery of the tray 4.

A delivery belt conveyor 7 is positioned in front of a delivery port of the package storehouse 1, and a transfer hook 8 is arranged corresponding to a row of placing shelves 3 in order to transfer the package 2 on the placing shelf 3 to a belt conveyor 7. Each of a number of hooks 8 is supported rotatably about a shaft 11 of a rotary actuator 10, and a holding portion 12 of the hook 8 can hold a flange 6 of the tray 4.

The rotary actuator 10 is secured to a support rod 13, and opposite ends of the support rod 13 are secured to and supported on arms 14 and 15. Both the arms 14 and 15 are secured to transfer racks 16 and 17, which are in turn slidably supported by guide rods 21 and 22 which are extending through guide members 18a and 20a, and through guide members 18b, and 20b, respectively. and both ends of the guide rods 21 and 22 are secured to a frame. Rack teeth 23 and 24 are provided on the upper surfaces of the transfer racks 16 and 17, and pinions 25 and 26 are engaged with the rack teeth 23 and 24, respectively. The pinions 25 and 26 are integrally rotated by a shaft 27.

A pulley 28 is provided on one pinion 25, and a belt 31 is extended between the pulley 28 and a pulley 30 positioned oppositely of the former. The pulley 30 is coaxially secured to a pinion 32, and a rack 34 which vertically moves between the pinion 32 and a guide pinion 33 is engaged with the pinions 32 and 33. The rack 34 can be moved up and down by a fluid pressure cylinder 35.

In operation of the apparatus, when fluid is supplied to one side of a piston within the fluid pressure cylinder 35, the rack 34 moves upward to rotate the pinion 32 clockwise. Thereby, the pinion 25 is rotated through the pulley 30, the belt 31 and pulley 28, and at the same time, the pinion 26 connected by the shaft 27 also rotates. By the rotation of both the pinions 25 and 26, the transfer racks 16 and 17 engaged therewith are moved from the belt conveyor 7 side toward the package stocker 1 side. All the arms 14, 15, the support rod 13, the rotary actuator 10 and the hook 8 are integrally moved by the movement of the transfer racks 16 and 17. At that time, the hook 8 is rotated by the rotary actuator 10 clockwise in the figure to assume an open state, and the hook 8 is rotated counterclockwise by the rotary actuator 10 at the end of movement described above so that the holding portion 12 of the hook 8 rotates and holds the flange 6 of the tray 4 from the top.

After the hook 8 has held the tray 4 and when fluid is supplied to the other side of the piston in the fluid pressure actuator 35, the rack 34 is moved down, and the transfer racks 23 and 24 are moved toward the belt conveyor by the operation reversed to the former. Accordingly, the package 2 is placed together with the tray on the belt conveyor 7, and at the same time, the rotary actuator 10 is rotated clockwise to disengage the holding portion 12 from the flange 8 of the tray 14. A package placed on the belt conveyor 7 is transported by the belt conveyor to the next processing step.

While in the foregoing description, only the operation of a single hook secured to the support rod 13 has been described, it is to be noted that similar operation is carried out for other hooks 8 secured to the support rod 13. Furthermore, while in the foregoing description, an apparatus for taking out the package 2 from the package storehouse 1 to transfer it to the belt conveyor 7 has been described, it is to be noted that this arrangement is also used for an apparatus for transferring a package from a belt conveyor provided on the other side of a package storehouse to an empty placing shelf within the package storehouse.

Being constructed as described above, in the present invention, since a large quantity of packages can be stored in a narrow package storehouse, a good space efficiency is obtained. Particularly, since a fluid pressure cylinder for transferring a package between a package storehouse and a belt conveyor is arranged in a vertical direction, a dead space formed as a result of provision of the fluid pressure cylinder can be minimized. Accordingly, spaces within the factory can be effectively utilized, and a space in the storehouse when the fluid pressure actuator is arranged on the package storehouse side can be also effectively utilized.

What is claimed is:
1. A package transfer device, comprising:
   a storehouse defining an interior and an exterior, the interior of the storehouse having a plurality of shelves for storing a plurality of packages on substantially circular trays, each of the trays having a circumferential flange,
   a conveyor provided substantially on the exterior of the storehouse,
   a first rack provided substantially on the exterior of the storehouse,
   a substantially vertically oriented actuator provided substantially on the exterior of the storehouse for moving the first rack in a substantially vertical direction,
   a second rack provided substantially above the conveyor,
   driving force transmitting means for moving the second rack in a substantially horizontal direction,
   a support rod connected with the second rack and positioned substantially above and parallel to the conveyor,
   hook means, provided on the support rod, for grasping the circumferential flange of at least one of the trays,
   whereby at least one of the plurality of packages on trays is transferable between the interior of the storehouse and the conveyor.
2. The device as in claim 1, wherein the driving force transmitting means comprises:
   a first pinion in engaging relationship with the first rack,
   a second pinion in engaging relationship with the second rack,
   a first pulley substantially coaxially secured to the first pinion,
   a second pulley substantially coaxially secured to the second pinion, and
   a belt extending between the first pulley and the second pulley.
3. The device as in claim 2, comprising:
   a third rack in mutually spaced, substantially parallel relationship with the second rack,
   a third pinion in engaging relationship with the third rack,
   a shaft connecting the second pinion and the third pinion,
   whereby the second pinion and the third pinion are integrally rotatable.
4. The device as in claim 3, wherein the support rod is provided with a plurality of hooks for grasping a plurality of trays.
5. The device as in claim 1, wherein at least one of the trays defines a flange portion, wherein the hook defines a holding portion for holding the flange portion of the tray, and further comprising rotary actuator means secured to the support rod for rotating the hook.

* * * * *